United States Patent [19]

Yazaki et al.

[11] 4,451,512

[45] May 29, 1984

[54] MULTI-LAYER PLASTIC VESSEL

[75] Inventors: Jinichi Yazaki, Tokyo; Kozaburo Sakano, Kawasaki; Junichi Matsuo, Yokohama, all of Japan

[73] Assignee: Toyo Seikan Kaisha, Ltd., Tokyo, Japan

[21] Appl. No.: 507,461

[22] Filed: Jun. 24, 1983

[30] Foreign Application Priority Data

Feb. 8, 1983 [JP] Japan ............................ 58-18036

[51] Int. Cl.³ ............................................. B65D 23/00
[52] U.S. Cl. ....................................... 428/36; 428/414; 428/516; 215/1 C; 215/12 R
[58] Field of Search .................. 428/36, 414; 215/1 C, 215/12 R; 325/65, 285, 301

[56] References Cited

U.S. PATENT DOCUMENTS

| | | | |
|---|---|---|---|
| 3,342,896 | 9/1967 | Zimmerman et al. | 525/65 |
| 3,397,166 | 8/1968 | Schmidle et al. | 525/65 X |
| 3,852,236 | 12/1974 | Neilman | 525/285 X |
| 4,079,850 | 3/1978 | Suzuki et al. | 215/1 C |
| 4,105,118 | 8/1978 | Williams, Jr. et al. | 428/414 X |
| 4,213,486 | 7/1980 | Samour et al. | 428/36 X |
| 4,245,061 | 1/1981 | Tachi et al. | 525/65 X |
| 4,257,536 | 3/1981 | Hilmar | 428/36 X |
| 4,281,045 | 7/1981 | Sumi et al. | 215/1 C X |
| 4,304,698 | 12/1981 | Tachi et al. | 525/65 X |
| 4,370,368 | 1/1983 | Hirata et al. | 215/1 C |

FOREIGN PATENT DOCUMENTS 2407871  7/1979  France ............................ 215/1 C Primary Examiner—George F. Lesmes
Assistant Examiner—Nancy A. B. Swisher
Attorney, Agent, or Firm—Sherman & Shalloway

[57] ABSTRACT

Disclosed is a multi-layer plastic vessel comprising a laminate including at least one layer composed mainly of a moisture-resistant thermoplastic resin, at least one layer composed mainly of an ethylene-vinyl alcohol copolymer and a thermoplastic resin adhesive layer interposed between both the resin layers, wherein said adhesive layer is composed of a composition comprising an acid- or acid anhydride-modified olefin resin and an epoxidized unsaturated carboxylic acid ester.

16 Claims, 2 Drawing Figures

MULTI-LAYER PLASTIC VESSEL

BACKGROUND OF THE INVENTION (1) Field of the Invention

The present invention relates to a multi-layer plastic vessel. More particularly, the present invention relates to a multi-layer plastic vessel comprising a laminate including a layer of a moisture-resistant thermoplastic resin such as an olefin resin and an oxygen-barrier layer composed of an ethylene-vinyl alcohol copolymer, in which an excellent gas-barrier property is maintained even under retort sterilization, hot filling or high humidity storage conditions.

(2) Description of the Prior Art

Laminates comprising an olefin resin excellent in the moisture resistance, such as polypropylene or polyethylene, and an ethylene-vinyl alcohol copolymer excellent in the oxygen-barrier property, which are bonded together through an adhesive resin layer composed of an acid- or acid anhydride-modified olefin resin, are used as vessels excellent in the content preservability in the form of a bottle, a cup, a tube, a pouch or the like in various fields.

Among various thermoplastic resins, an ethylene-vinyl alcohol copolymer is one of resins most excellent in the barrier property (permeation resistance) to various gases such as oxygen and perfume components. This resin is, however, defective in that the gas permeability is extremely increased under high humidity conditions, though the resin shows an excellent gas barrier property under low humidity conditions. The olefin resin laminated on the ethylene-vinyl alcohol copolymer shows the action of controlling permeation of water vapor to the ethylene-vinyl alcohol copolymer because of its moisture resistance. However, when a content is filled in this vessel and the vessel is subjected to so-called retort sterilization in the presence of hot water and water vapor, water vapor permeates through the olefin resin layer in an amount not negligible to allow the ethylene-vinyl alcohol copolymer layer to absorb the moisture, with the result that permeation of oxygen is caused to a degree much higher than in a vessel which has not been subjected to the retort sterilization. This disadvantage is similarly observed when the content is hot-filled and the vessel is sealed so as to improve the preservability or when the vessel is allowed to stand still under high humidity conditions for a long time.

SUMMARY OF THE INVENTION

It is therefore a primary object of the present invention is to provide a multi-layer plastic vessel comprising a laminate including an olefin resin layer and an ethylene-vinyl alcohol copolymer layer, in which the above-mentioned defect is eliminated.

Another object of the present invention is to provide a laminated plastic vessel comprising an olefin resin layer and an ethylene-vinyl alcohol copolymer layer, in which permeation of gases such as oxygen through the vessel wall is controlled to a low level even when the vessel is placed under severe hot water and/or hot water vapor conditions such as those adopted for the retort sterilization or when the vessel is stored under high humidity conditions.

Still another object of the present invention is to provide a laminated plastic vessel in which the content preservability is highly improved by very simple means and the adhesive strength between both the resin layers is prominently improved.

More specifically, in accordance with the present invention, there is provided a multi-layer plastic vessel comprising a laminate including at least one layer composed mainly of a moisture-resistant thermoplastic resin, at least one layer composed mainly of an ethylene-vinyl alcohol copolymer and a thermoplastic resin adhesive layer interposed between both the resin layers, wherein said adhesive layer is composed of a composition comprising an acid- or acid anhydride-modified olefin resin and an epoxidized unsaturated carboxylic acid ester.

DETAILED DESCRIPTION OF THE INVENTION

Figure 1:
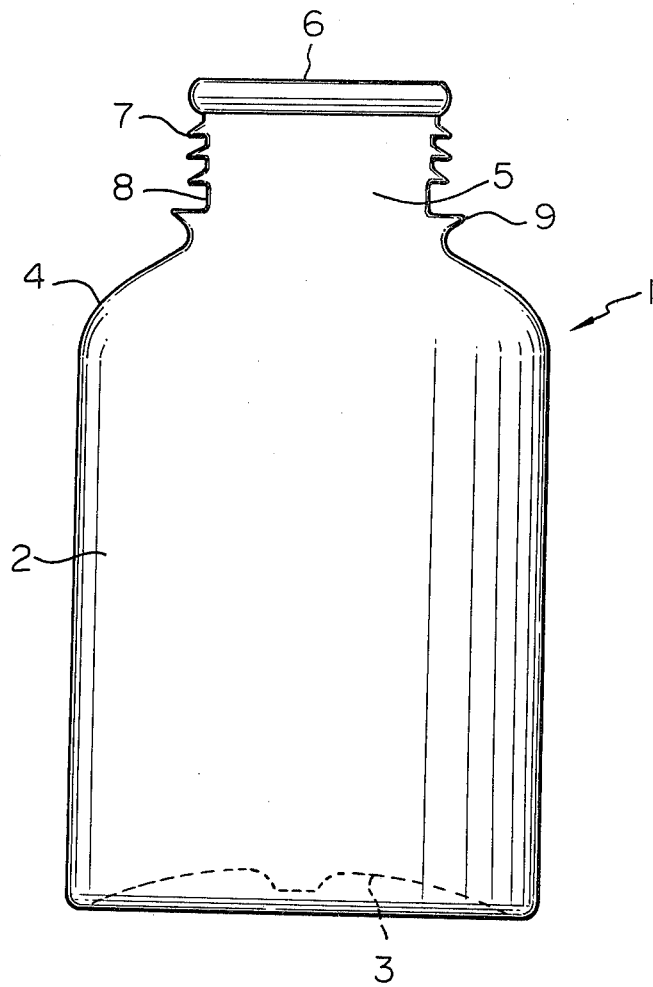
FIG. 1 is a diagram illustrating a bottle-shaped vessel according to the present invention.

FIG. 1 is a diagram showing a bottle-shaped vessel according to the present invention. This vessel comprises a barrel 2, a bottom 3 connected to the lower end of the barrel 2, a conical shoulder 4 connected to the upper end of the barrel 2 and a neck 5 connected to the upper end of the shoulder 4, which are integrally formed by melt-blow molding or draw-blow molding of a laminate 1 described in detail hereinafter. A screw 7 or step portion 8 for holding a lid (not shown) for sealing an opening 6 or a support ring 9 for holding the bottle when the lid is fitted and engaged to the opening 6 is formed on the neck 5.

Figure 2:
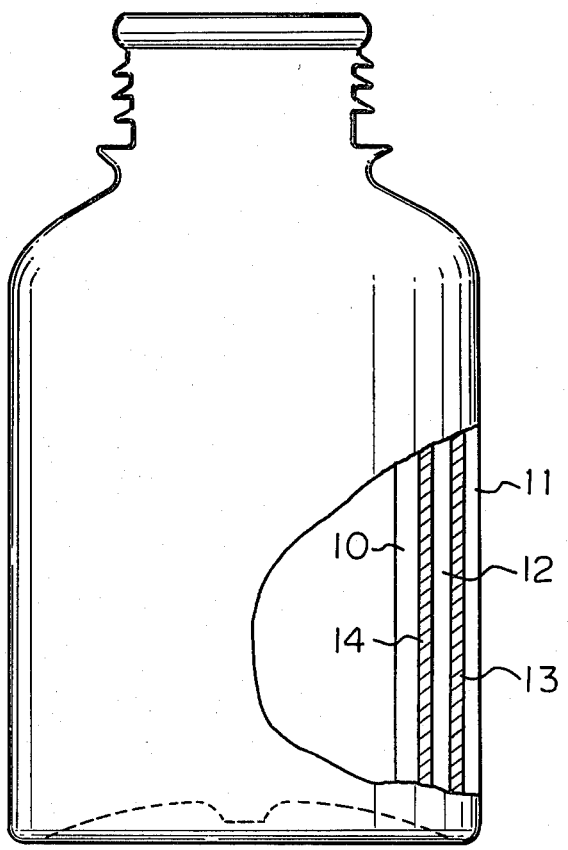
FIG. 2 is an enlarged sectional view showing the laminate constituting the vessel shown in FIG. 1.

Referring to FIG. 2 which is an enlarged sectional view of the laminate 1 constituting this vessel, the laminate 1 comprises an inner surface layer 10 composed mainly of an olefin resin, an outer surface layer 11 composed mainly of an olefin resin and a gas-barrier layer 12 composed mainly of an ethylene-vinyl alcohol copolymer, which is interposed between both the surface layers. The copolymer layer 12 is bonded to the olefin resin layers 10 and 11 by hot bonding through adhesive layers 13 and 14 described in detail hereinafter.

One of important features of the present invention resides in the use of a composition comprising an acid- or acid anhydride-modified olefin resin and an epoxidized unsaturated carboxylic acid ester for the adhesive layers 13 and 14.

More specifically, the present invention is based on the novel and unexpected finding that if an epoxidized unsaturated carboxylic acid ester is incorporated in an acid- or acid anhydride-modified olefin resin adhesive layer to be used for bonding an olefin resin to an ethylene-vinyl alcohol copolymer, even when the resulting laminate is exposed to severe hot water and/or hot water vapor conditions such as those adopted for the retort sterilization, the reduction of the gas-barrier property is controlled to a very low level.

For example, in case of a film of an ethylene-vinyl alcohol copolymer having an ethylene content of 30 mole %, the oxygen permeation coefficient is $4.5 \times 10^{-14}$ cc.cm/cm$^2$.sec.cmHg as measured at 20° C. and 0% relative humidity but is increased by one figure, that is, to $1.7 \times 10^{-}$cc.cm/cm$^2$.sec.cmHg when measured at 20° C. and 100% relative humidity, though the oxygen permeation coefficient of the copolymer differs to some extent according to the ethylene content. These values are those measured at such a low temperature as 20° C., and when the ethylene-vinyl alcohol is exposed to such a high temperature as 120° C. and also to the attack of water vapor, the oxygen permeation coefficient of the copolymer is drastically increased. For example, the oxygen concentration in a polypropylene/ethylene-vinyl alcohol copolymer/polypropylene pouch which has not been subjected to the retort sterilization but allowed to stand still for one week is about 0.01% and is maintained at the substantially same level as just after sealing, but the oxygen concentration just after the retort sterilization is about 10 to about 20 times as high as the above-mentioned level and after the lapse of one week, the oxygen concentration is about 15 to about 25 times as high as the above-mentioned level.

According to the present invention, by incorporating an epoxidized unsaturated carboxylic acid ester into an adhesive layer of an acid- or acid anhydride-modified olefin resin to be interposed between an olefin resin and an ethylene-vinyl alcohol copolymer, the permeation of oxygen is controlled to a very low level during or after the retort sterilization, as shown in Examples given hereinafter. The reason has not completely been elucidated, but since the gas-barrier property of the ethylene-vinyl alcohol copolymer is not reduced by an ordinary heat treatment, it is believed that if the copolymer is subjected to a heat treatment in the presence of water vapor or in the state where water of adsorption is contained, prominent reduction of the gas-barrier property is caused. The olefin resin or the acid- or acid anhydride-modified olefin resin present as the interposed adhesive layer allows considerable permeation of water vapor under retort sterilization conditions, and it is believed that this water vapor brings about reduction of the gas-barrier property of the ethylene-vinyl alcohol. The epoxidized unsaturated carboxylic acid ester that is used in the present invention contains an oxirane ring in the molecule, and it is believed that this oxirane ring exerts a barrier effect to water vapor which is to permeate under the retort sterilization conditions or reacts with water vapor, whereby intrusion of water vapor into the ethylene-vinyl alcohol copolymer is prevented.

Furthermore, the epoxidized unsaturated carboxylic acid ester that is used in the present invention has a good compatibility with an acid- or acid anhydride-modified olefin resin and a good dispersion state of the ester in the modified olefin resin is maintained even under the retort sterilization conditions. This is another unexpected effect attained according to the present invention. For example, when a non-epoxidized unsaturated carboxylic acid ester is incorporated in an acid- or acid anhydride-modified olefin resin or when an epoxidized unsaturated carboxylic acid ester is incorporated in an unmodified olefin resin, extreme bleeding-out of the carboxylic acid ester is observed. On the other hand, if an epoxidized unsaturated carboxylic acid ester is incoporated into an acid- or acid anhydride-modified olefin resin according to the present invention, occurrence of this bleeding-out phenomenon is prominently controlled.

When an oxirane ring-containing compound is incorporated in an acid- or acid anhydride-modified olefin resin, the adhesive strength is highly improved over the adhesive strength attainable by the single use of the acid- or acid anhydride-modified olefin resin. This still another advantage attained by the present invention in addition to the foregoing advantages.

An acid- or acid anhydride-modified olefin resin (hereinafter referred to as "AMOR") has a good adhesiveness to an olefin resin and an olefin-vinyl alcohol copolymer (hereinafter referred to as "OVAR"), and the portion having a lowest adhesive strength in this bonded structure is the adhesion interface between AMOR and OVAR. For example, the peel strength in the hot adhesion interface between acid-modified polypropylene and OVAR is about 800 g/1.5 cm of the width at highest. When an oxirane ring-containing compound such as epoxidized soybean oil is incorporated in acid-modified polypropylene, the peel strength in the hot adhesion interface to OVAR is increased to a level where peeling is impossible, that is, 3 Kg/1.5 cm of the width or higher, and an unexpected effect of improving the adhesive strength is attained according to the present invention.

When a composition comprising AMOR and an oxirane ring-containing compound is used for bonding an olefin resin to OVAR, in addition to the effect of highly improving the adhesive strength, various advantages can be attained. For example, this composition can be hot-molded as well as ordinary AMOR and hot bonding can easily be accomplished.

The reason why the adhesive strength to an olefin-vinyl alcohol copolymer (OVAR) is highly improved by incorporating an oxirane ring-containing compound in an acid- or acid anhydride-modified olefin resin (AMOR) according to the present invention has not completely been elucidated. However, we consider as follows.

It is known that when an epoxy resin in cured, it tightly adheres to the surface with which the epoxy resin is contacted. Also in case of the composition of the present invention, it is expected that during the hot bonding, reaction should naturally take place between the acid or acid anhydride group in AMOR and the oxirane ring (epoxy group) in the oxirane ring-containing compound, and it is believed that a strong bonding to OVAR is formed during this reaction. Furthermore, it is believed that since the oxirane ring-containing compound is interposed between the acid or acid anhydride group in AMOR and the hydroxyl group in OVAR, chemical bonding between both the resin layers is made closer and formed more assuredly.

In addition to formation of this chemical bonding in the interface between both the resin layers, good mingling of both the resins in the interface is believed to be another cause of the improvement of the adhesive strength. More specifically, most of oxirane ring-containing compounds such as epoxidized soybean oil have a plasticizing action, and it is believed that the oxirane ring-containing compound incorporated in AMOR improves the wettability between both the resin layers by its plasticizing action and provides better mingling of both the resins in the adhesion interface. Furthermore, by this plasticizing action, the hot moldability of the adhesive layer, for example, the extrusion property or the adaptability to the coating operation, is prominently improved, and moreover, the adaptability to the hot bonding operation is improved.

It also is known that most of oxirane ring-containing compounds exert a function of imparting a good heat stability to resins when incorporated therein. Although an acid- or acid anhydride-modified olefin resin is relatively poor in the heat stability, by the incorporation of the oxirane ring-containing compound, the stability at the hot molding or hot bonding step is prominently improved.

In the present invention, any of olefin resin graft-modified with ethylenically unsaturated carboxylic acids or anhydrides thereof can be used as the acid- or acid anhydride-modified olefin resin (AMOR). As the acid or acid anhydride, there can be mentioned, for example, acrylic acid, methacrylic acid, crotonic acid, maleic acid, fumaric acid, itaconic acid, citraconic acid, maleic anhydride, itaconic anhydride, citraconic anhydride and tetrahydrophthalic anhydride. Among these compounds, maleic anhydride is especially preferred.

As the olefin resin as the trunk polymer of the graft copolymer, there can be mentioned low density polyethylene, medium density polyethylene, high density polyethylene, isotactic polypropylene, a propylene-ethylene copolymer, a propylene-butene-1 copolymer, a propylene-ethylene-butene-1 copolymer, an ethylene-vinyl acetate copolymer, an ion-crosslinked olefin copolymer (ionomer) and blends of two or more of the foregoing polymers.

In the present invention, an acid- or acid anhydride-modified olefin resin as mentioned above may be used singly, or in order to maintain the acid group concentration of the composition within a certain range, at least one acid- or acid anhydride-modified olefin resin may be used in the form of a mixture with at least one unmodified olefin resin or a blend of modified olefin resins different in the degree of the acid modification may be used.

Any of compounds containing at least one oxirane ring in the molecule can optionally be used as the oxirane ring-containing compound. The oxirane ring-containing compound may be in the form of a liquid, a solid or a semi-solid, so far as it can be blended with the acid- or acid anhydride-modified olefin resin.

As preferred examples of the oxirane ring-containing compound, the following compounds can be mentioned though compounds that can be used in the present invention are not limited to the compounds mentioned below.

(1) Epoxidized glycerides such as epoxidized soybean oil, epoxidized castor oil, epoxidized linseed oil and epoxidized safflower oil.

(2) Epoxidized fatty acid esters such as epoxidized linseed oil fatty acid butyl ester, epoxidized octyl oleate, epoxidized iso-octyl oleate and epoxidized 2-ethylhexyl oleate.

(3) Epoxy hexahydrophthalic acid esters represented by the following formula:

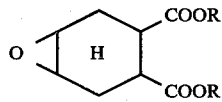

wherein R stands for a higher alkyl group such as a 2-ethylhexyl or isododecyl group.

(4) Other oxirane ring-containing compounds such as 3-(2-xenoxy)-1,2-epoxypropane, styrene oxide, vinylcyclohexene oxide, glycidyl phthalate, epoxidized polybutadiene, phenyl glycidyl ether, polyethylene glycol bisepoxide, bisphenol A bisepoxide and epoxidized polyethylene wax.

In the present invention, among the above-mentioned oxirane ring-containing compounds, the epoxidized carboxylic acid esters (1) through (3) are especially preferred.

In the adhesive composition that is used in the present invention, it is important that the concentration of the carbonyl group based on the acid- or acid anhydride-modified olefin resin should be 1 to 600 millimoles, especially 5 to 300 millimoles, per 100 g of the composition and the concentration of the oxirane oxygen based on the oxirane ring-containing compound should be 0.01 to 50 millimoles, especially 0.1 to 20 millimoles, per 100 g of the composition.

If the carbonyl group or oxirane oxygen concentration is too low and below the above-mentioned range, the adhesive force to the OVAR layer is much smaller than the adhesive force attained when the carbonyl group or oxirane oxygen concentration is within the range specified in the present invention. When the carbonyl group or oxirane oxygen concentration is too high and exceeds the above range, the hot moldability or hot adhesiveness tends to be reduced and the adhesive layer comes to have an inherent smell or color. In the adhesive composition that is used in the present invention, reaction tends to occur between the oxirane ring and the acid or acid anhydride group at the hot bonding step, and hence, by the above-mentioned carbonyl group or oxirane ring concentration is meant the concentration at the time of blending.

Incorporation of the oxirane ring-containing compound in AMOR can easily be accomplished by dry or wet blending of both the components or by kneading them under heating and, if necessary, pelletizing the kneaded mixture. In order to prevent mutual reactions between the two components as much as possible, it is preferable to adopt a method in which the oxirane ring-containing compound is kneaded with an unmodified olefin resin, the kneaded mixture is pelletized, the resulting pellet is dry-blended with a pellet of AMOR or a pellet of a kneaded mixture of AMOR and an unmodified olefin resin and the dry blend is used for the hot bonding.

In the present invention, a copolymer having units of ethylene alone or in combination with a minor amount of units of other olefin such as propylene and vinyl alcohol units obtained by saponification of units of a vinyl ester such as vinyl acetate is used as the ethylene-vinyl alcohol copolymer. In view of the gas-barrier property and moisture resistance, the olefin-vinyl alcohol copolymer should contain 40 to 80 mole %, especially 50 to 75 mole %, of the vinyl alcohol units and the residual vinyl ester unit content should be up to 4 mole %, especially up to 1 mole %. It is preferred that the inherent viscosity of the ethylenevinyl alcohol copolymer be 0.07 to 0.17 l/g as measured at 30° C. in a mixed solvent comprising 85% by weight of phenol and 15% by weight of water.

This olefin-vinyl alcohol copolymer alone may be used as the gas-barrier layer, or a blend of this olefin-vinyl alcohol copolymer with other thermoplastic resin may be used as the gas-barrier layer. As a preferred example of the blend, there can be mentioned a blend comprising an ethylene-vinyl alcohol copolymer and a polyamide at a weight ratio of from 95/5 to 40/60, especially from 90/10 to 50/50. As disclosed in Japanese Patent Publication No. 42493/82, this blend has an oxygen permeation coefficient as small as that of the ethylene-vinyl alcohol copolymer and is excellent in the draw-moldability and the blend can advantageously be used for formation of a vessel by draw-blow molding or by sheet molding.

As the moisture-resistant thermoplastic resin to be used for the other resin layer, olefin resins such as low density polyethylene, medium density polyethylene, high density polyethylene, isotactic polypropylene, a crystalline propylene-ethylene copolymer, a crystalline propylene-butene-1 copolymer, a crystalline propylene-butene-1-ethylene terpolymer, an ethylene-vinyl acetate copolymer and an ion-crosslinked olefin copolymer (ionomer) can be used advantageously from the economical viewpoint or in view of the mechanical properties.

The moisture-resistant resin that can be used is not limited to olefin resins such as mentioned above. Namely, thermoplastic polyesters, especially those composed mainly of ethylene terephthalate or butylene terephthalate units, polycarbonates and film-forming acrylic resins can also be used as the moisture-resistant resin. The adhesive composition that is used in the present invention has an excellent adhesiveness to these resins.

In the vessel of the present invention, any laminate structure can be adopted, so far as the above-mentioned adhesive composition (ADC) is interposed between the moisture-resistant resin layer (MRR) and the ethylene-vinyl alcohol copolymer layer (EV). For example, there can be adopted an MRR/ADC/EV/ADC/MRR five-layer structure as shown in the drawings, an MRR/ADC/EV three-layer structure and an MRR/ADC/EV/ADC four-layer structure.

The thickness of each of the three layers may optionally be changed, but in order to obtain an optimum combination of the gas-barrier property, impact resistance, rigidity and resistance to the interlaminar peeling, it is preferred that the MRR layer be thickest, the ADC layer be thinnest and the EV layer should have an intermediate thickness. More specifically, it is preferred that the MRR/EV thickness ratio be in the range of from 200/1 to 5/1 and the MRR/ADC thickness ratio be in the range of from 150/1 to 5/1. It also is preferred that the thickness of the laminate in the form of a final vessel be 50 to 3000 microns, especially 100 to 2000 microns.

Formation of the laminate can advantageously be accomplished by the multi-layer co-extrusion. Since both the resins are sufficiently mingled in the bonding interface between the two resin layers by the multi-layer co-extrusion, a laminate structure especially excellent in the adhesive strength can be obtained. At the time of the multi-layer co-extrusion, the moisture-resistant resin, the gas-barrier resin and the adhesive composition are melted and kneaded in respective extruders and the melts are extruded through a multi-layer multi-ply die in such a positional relationship that the adhesive composition is interposed between the moisture-resistant resin layer and the gas-barrier resin layer adjacently thereto, whereby a film, a sheet, a pipe for a bottle or a parison for a bottle is formed. Incidentally, in case of a parison for a bottle, the extruded molten resin layers are preliminarily blow-molded in a mold, or the extruded multi-layer pipe is rapidly cooled and is then cut into a predetermined length. Then, both the open end portions of the pipe are heated and subjected to compression molding to effect formation of the mouth portion and melt adhesion of the bottom, whereby the intended parison is obtained.

Formation of the laminate can be accomplished by such methods as hot pressing, sandwich lamination and extrusion coating. For example, the laminate can be prepared by applying a melted film, powder, suspension or solution of the adhesive composition in the form of a thin layer between pre-formed moisture-resistant and ethylene-vinyl alcohol copolymer films and, if necessary, compressing the assembly under heating. Furthermore, the laminate can be formed by co-extruding an intermediate layer of the ethylene-vinyl alcohol copolymer and inner and outer layers of the adhesive composition between two films of the moisture-resistant resin and pressing the co-extrudate by the moisture-resistant resin films in the form of a sandwich. Moreover, there may be adopted a method in which the adhesive composition and ethylene-vinyl alcohol copolymer are successively extruded and coated on the surface of a moisture-resistant resin film and a method in which pre-formed three kinds of films are hot-pressed or hot-rolled in the above-mentioned lamination order.

Furthermore, a parison having a multi-layer structure can be prepared according to a method in which the adhesive composition and the ethylene-vinyl alcohol copolymer are injected in succesion on the inner or outer surface of a bottomed parison composed of the moisture-resistant resin.

The laminate structure of the present invention is valuable for formation of a draw-blow molded vessel or a sheet-molded vessel. For example, draw-blow molding can be accomplished by known means except that the above-mentioned multi-layer parison is used. More specifically, the multi-layer parison is pre-heated at a drawing temperature prior to draw-blowing. The drawing temperature is a temperature lower than the crystallization temperature of the moisture-resistant resin but high enough to allow drawing of the multi-layer parison. Namely, the drawing temperature is 75° to 130° C., especially 80° to 110° C., in case of a polyester and 145° to 175° C., especially 150° to 170° C., in case of polypropylene.

The pre-heated parison is draw-blow-molded by known means such as successive draw-blow molding or simultaneous draw-blow molding. For example, in case of successive draw-blow molding, the parison is mechanically drawn in the axial direction under blowing of a fluid at a relatively low pressure by means of a drawing rod and is then expanded and drawn in the circumferential direction of the vessel under blowing of a fluid at a relatively high pressure. In case of simultaneous draw-blow molding, drawing in the axial direction and drawing in the circumferential direction are simultaneously accomplished under blowing of a fluid at a high pressure. Drawing of the parison in the axial direction can easily be accomplished, for example, by gripping the neck portion of the parison between a mold and a mandrel, applying a drawing rod to the inner surface of the bottom portion of the parison and elongating the drawing rod. It is preferred that the parison be drawn at a draw ratio of 1.5 to 2.5 in the axial direction and at a draw ratio of 1.7 to 4.0 in the circumferential direction.

In the barrel portion of the draw-blow-molded vessel, the layer of polypropylene, polyethylene terephthalate or the like is molecularly oriented, whereby high impact resistance, rigidity and transparency desirable for a bottle-shaped vessel are improved. Furthermore, by dint of the presence of the olefin-vinyl alcohol copolymer layer, an excellent barrier property to gases such as oxygen, nitrogen, carbon dioxide gas and perfume components can be obtained and by dint of the presence of the above-mentioned adhesive composition layer, an excellent interlaminar adhesion can be attained.

In case of a sheet-molded vessel, the above-mentioned multi-layer film or multi-layer sheet is pre-heated at the above-mentioned drawing temperature and the pre-heated film or sheet is formed into a cup by vacuum forming, air-pressure forming, plug-assist forming or press forming.

Of course, the vessel of the present invention is valuable as a blow-molded vessel or tubular vessel formed by extruding the above-mentioned laminate in the form of a parison and blow-molding the parison in the molten state.

The present invention will now be described in detail with reference to the following Examples that by no means limit the scope of the invention.

EXAMPLE 1

Three-resin five-layer laminated plastic bottles (having an inner capacity of 500 cc) comprising inner and outer layers composed of polypropylene, an intermediate layer composed of an ethylene-vinyl alcohol copolymer having a vinyl alcohol content of 70 mole % and adhesive layers composed of a composition comprising maleic anhydride-modified polypropylene having a carbonyl group concentration of 100 millimoles per 100 g of the composition and polypropylene containing therein epoxidized soybean oil having an oxirane oxygen content of 6.5% were formed by using an extruder for inner and outer layers, which was provided with a full-flighted screw having a diameter of 65 mm and an effective length of 1430 mm, an extruder for an intermediate layer, which was provided with a full-flighted screw having a diameter of 50 mm and an effective length of 1100 mm, an extruder for adhesive layers and a 5-ply flat die, while changing the content of the epoxidized soybean oil in the adhesive layers as indicated in Table 1.

In these bottles, the average thickness of the barrel portion was 500μ and the inner layer/adhesive layer/intermediate layer/adhesive layer/outer layer thickness ratio was 10/1/2/1/10.

With respect to each of the so-molded plastic bottles, the oxygen concentrations were measured before the retorting operation, just after the retorting operation and after the lapse of 2 weeks from the point of completion of the retorting operation, and the adhesive force was determined. The obtained results are shown in Table 1.

TABLE 1

| Sample | Content (%) of Epoxidized Soybean Oil | Oxygen Concentration (%) | | | | Adhesive Force (g/15 cm width) |
|---|---|---|---|---|---|---|
| | | before retorting (below 20 % relative humidity) | just after retorting (100% relative humidity) | after lapse of 2 weeks (30° C. 80% relative humidity) | after lapse of 2 weeks (not retorted) (30° C., 80% relative humidity) | |
| A (comparison) | 0 | 0.01 | 0.48 | 0.48 | 0.06 | 700 |
| B (present invention) | 0.25 | 0.01 | 0.09 | 0.19 | 0.03 | not peeled |
| C (present invention) | 0.50 | 0.01 | 0.07 | 0.16 | 0.02 | not peeled |
| D (present invention) | 1.00 | 0.01 | 0.05 | 0.10 | 0.02 | not peeled |

From the results shown in Table 1, it will readily be understood that in plastic bottles (samples B through C) formed by incorporating epoxidized soybean oil in the adhesive layer according to the present invention, permeation of oxygen is controlled to a very low level even after the retort sterilization and the adhesive force between the resin layers is prominently improved.

EXAMPLE 2

Plastic bottles were formed in the same manner as described in Example 1 except that epoxidized octyl oleate having an oxirane oxygen content of 4.1% was used instead of the epoxidized soybean oil having an oxirane oxygen content of 6.5%. The oxygen concentrations in the vessels and the adhesive forces were measured in the same manner as described in Example 1. The obtained results are shown in Table 2.

TABLE 2

| Sample | Content (%) of Epoxidized Octyl Oleate | Oxygen Concentration (%) | | | | Adhesive Force (g/15cm width) |
|---|---|---|---|---|---|---|
| | | before retorting (below 20 % relative humidity) | just after retorting (100% relative humidity) | after lapse of 2 weeks 30° C., 80% relative humidity) | after lapse of 2 weeks (not retorted) (30° C., 80% relative humidity) | |
| E (present invention) | 0.5 | 0.01 | 0.08 | 0.23 | 0.04 | not peeled |
| F (present invention) | 1.0 | 0.01 | 0.07 | 0.19 | 0.03 | not peeled |
| G (present invention) | 1.5 | 0.01 | 0.06 | 0.15 | 0.03 | not peeled |
| H (present invention) | 2.0 | 0.01 | 0.05 | 0.12 | 0.03 | not peeled |

EXAMPLE 3

Plastic bottles were formed in the same manner as described in Example 1 except that epoxy hexahydrophthalic acid ester having an oxirane oxygen content of 3.8% was used instead of the epoxidized soybean oil having an oxirane oxygen content of 6.5%. The oxygen concentrations and adhesive forces were measured in the same manner as described in Example 1. The obtained results are shown in Table 3.

EXAMPLE 5

Plastic preforms (bottomed parisons) were obtained in the same manner as described in Example 1 except that polyethylene terephthalate was used for the inner and outer layers, an ethylene-vinyl alcohol copolymer having a vinyl alcohol content of 60 mole % was used for the intermediate layer and a composition comprising maleic anhydride-modified polypropylene having a carbonyl group concentration of 200 millimoles per 100 g of the composition and propylene containing therein epoxidized soybean oil having an oxirane oxygen content of 6.5% was used for the adhesive layers. The preforms were heated at 100° C. for 20 seconds and biaxially draw-blow-molded by using a known biaxial draw-blow molding machine to obtain biaxially draw-blow-molded bottles having an inner capacity of 500 cc and an average barrel thickness of 400μ.

With respect to these bottles, the oxygen concentrations and adhesive forces were measured in the same manner as in Example 4. The obtained results are shown in Table 5.

TABLE 3

| | | Oxygen Concentration (%) | | | | |
|---|---|---|---|---|---|---|
| Sample | Content (%) of Epoxy Hexahydro-phthalic Acid Ester | before retorting (below 20 % relative humidity) | just after retorting (100% relative humidity) | after lapse of 2 weeks (30° C., 80% relative humidity) | after lapse of 2 weeks (not retorted) (30° C., 80% relative humidity) | Adhesive Force (g/15 cm width) |
| I (present invention) | 0.5 | 0.01 | 0.09 | 0.20 | 0.03 | 2400 |
| J (present invention) | 1.0 | 0.01 | 0.08 | 0.17 | 0.03 | 2600 |
| K (present invention) | 1.5 | 0.01 | 0.07 | 0.16 | 0.02 | 2600 |
| L (present invention) | 2.0 | 0.01 | 0.06 | 0.14 | 0.02 | 2600 |

EXAMPLE 4

Plastic bottles were formed in the same manner as described in Example 1 except that polyethylene terephthalate was used for the inner and outer layers, an ethylene-vinyl alcohol copolymer having a vinyl alcohol content of 70 mole % was used for the intermediate layer and a composition comprising maleic anhydride-modified polypropylene having a carbonyl group concentration of 200 millimoles per 100 g of the composition and polypropylene containing therein epoxidized soybean oil having an oxirane oxygen content of 6.5% was used for the adhesive layers.

These plastic bottles were stored under various humidity conditions shown in Table 4 and the oxygen concentrations in the bottles and the adhesive forces were measured. The obtained results are shown in Table 4.

TABLE 4

| | | Oxygen Concentration (%) | | | Adhesive Force (g/15 mm width) | |
|---|---|---|---|---|---|---|
| Sample | Content (%) of Epoxidized Soybean Oil | initial oxygen concentration | after 2 weeks' storage at 30° C. and 20% relative humidity | after 2 weeks' storage at 30° C. and 60% relative humidity | after 2 weeks' storage at 30° C. and 85% relative humidity | on the side of the inner or outer surface layer | on the side of the intermediate layer |
| M (comparison) | 0 | 0.01 | 0.02 | 0.08 | 0.15 | below 10 | 630 |
| N (present invention) | 0.25 | 0.01 | 0.02 | 0.04 | 0.10 | 850 | not peeled |
| O (present invention) | 0.5 | 0.01 | 0.02 | 0.03 | 0.08 | 1200 | not peeled |
| P (present invention) | 1.0 | 0.01 | 0.02 | 0.02 | 0.05 | 1700 | not peeled |

TABLE 5

| | | Oxygen Concentration (%) | | | Adhesive Force (g/15 mm width) | |
|---|---|---|---|---|---|---|
| Sample | Content (%) of Epoxidized Soybean Oil | initial oxygen concentration | after 2 weeks' storage at 30° C. and 20% relative humidity | after 2 weeks' storage at 30° C. and 60% relative humidity | after 2 weeks' storage at 30° C. and 85% relative humidity | on the side of the inner or outer surface layer | on the side of the intermediate layer |
| Q (comparison) | 0 | 0.01 | 0.02 | 0.07 | 0.12 | below 10 | 320 |
| R (present invention) | 0.25 | 0.01 | 0.02 | 0.04 | 0.09 | 800 | 2100 |

TABLE 5-continued

| | | Oxygen Concentration (%) | | | | Adhesive Force (g/15 mm width) | |
|---|---|---|---|---|---|---|---|
| Sample | Content (%) of Epoxidized Soybean Oil | initial oxygen concentration | after 2 weeks' storage at 30° C. and 20% relative humidity | after 2 weeks' storage at 30° C. and 60% relative humidity | after 2 weeks' storage at 30° C. and 85% relative humidity | on the side of the inner or outer surface layer | on the side of the intermediate layer |
| S (present invention) | 0.5 | 0.01 | 0.02 | 0.03 | 0.07 | 1100 | 2500 |
| T (present invention) | 1.0 | 0.01 | 0.02 | 0.02 | 0.04 | 1500 | 2700 |

What is claimed is:

1. A multi-layer plastic vessel comprising a laminate including at least one layer composed mainly of a moisture-resistant thermoplastic resin, at least one layer composed mainly of an ethylene-vinyl alcohol copolymer and a thermoplastic resin adhesive layer interposed between both the resin layers, wherein said adhesive layer is composed of a composition comprising an acid- or acid anhydride-modified olefin resin and an epoxidized unsaturated carboxylic acid ester.

2. A multi-layer plastic vessel as set forth in claim 1, wherein the modified olefin resin is an olefin resin modified with acrylic acid, methacrylic acid, crotonic acid, maleic acid, fumaric acid, itaconic acid, citraconic acid, maleic anhydride, itaconic anhydride, citraconic anhydride or tetrahydrophthalic anhydride.

3. A multi-layer plastic vessel as set forth in claim 1, wherein the modified olefin resin is an olefin resin modified with maleic anhydride.

4. A multi-layer plastic vessel as set forth in claim 1, wherein the modified olefin resin is at least one member selected from the group consisting of low density polyethylene, medium density polyethylene, high density polyethylene, isotactic polypropylene, a propylene-ethylene copolymer, a propylene-butene-1 copolymer, a propylene-ethylene-butene-1 copolymer, an ethylene-vinyl acetate copolymer and an ion-crosslinked olefin copolymer.

5. A multi-layer plastic vessel as set forth in claim 1, wherein the composition constituting the adhesive layer further comprises at least one unmodified olefin resin.

6. A multi-layer plastic vessel as set forth in claim 1, wherein the epoxidized unsaturated carboxylic acid ester is a member selected from the group consisting of epoxidized soybean oil, epoxidized castor oil, epoxidized linseed oil, epoxidized safflower oil, epoxidized linseed oil fatty acid butyl ester, epoxidized octyl oleate, epoxidized iso-octyl oleate, epoxidized 2-ethylhexyl oleate and epoxy hexahydrophthalic acid esters represented by the following formula:

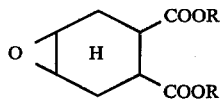

wherein R stands for a higher alkyl group such as a 2-ethylhexyl or isododecyl group.

7. A multi-layer plastic vessel as set forth in claim 1, wherein in the composition constituting the adhesive layer, the concentration of the carbonyl groups based on the acid- or acid anhydride-modified olefin resin is 1 to 600 millimoles per 100 g of the composition and the concentration of oxirane oxygen based on the epoxidized unsaturated carboxylic acid ester is 0.01 to 50 millimoles per 100 g of the composition.

8. A multi-layer plastic vessel as set forth in claim 1, wherein the ethylene-vinyl alcohol copolymer contains 40 to 80 mole % of vinyl alcohol units and the residual vinyl ester unit content in the ethylene-vinyl alcohol copolymer is up to 4 mole %.

9. A multi-layer plastic vessel as set forth in claim 1, wherein the ethylene-vinyl alcohol copolymer has an inherent viscosity of 0.07 to 0.17 l/g as measured at 30° C. in a mixed solvent comprising 85% by weight of phenol and 15% by weight of water.

10. A multi-layer plastic vessel as set forth in claim 1, wherein the layer composed mainly of the ethylene-vinyl alcohol copolymer is a layer composed of a blend comprising an ethylene-vinyl alcohol copolymer and a polyamide at a weight ratio of from 95/5 to 40/60.

11. A multi-layer plastic vessel as set forth in claim 1, wherein the moisture-resistant thermoplastic resin is an olefin resin selected from the group consisting of low density polyethylene, medium density polyethylene, high density polyethylene, isotactic polypropylene, a crystalline propylene-ethylene copolymer, a crystalline propylene-butene-1 copolymer, a crystalline propylene-butene-1-ethylene terpolymer, an ethylene-vinyl acetate copolymer and an ion-crosslinked olefin copolymer.

12. A multi-layer plastic vessel as set forth in claim 1, wherein the moisture-resistant thermoplastic resin is a member selected from the group consisting of thermoplastic polyesters, polycarbonates and film-forming acrylic resins.

13. A multi-layer plastic vessel as set forth in claim 1, wherein the thickness of the laminate is 50 to 3000 microns.

14. A multi-layer plastic vessel as set forth in claim 1, wherein the moisture-resistant thermoplastic resin layer/ethylene-vinyl alcohol copolymer thickness ratio is in the range of from 200/1 to 5/1 and the moisture-resistant thermoplastic resin layer/adhesive layer thickness ratio is in the range of from 150/1 to 5/1.

15. A multi-layer plastic vessel as set forth in claim 1, which is formed by draw-blow molding of a multi-layer parison of said laminate or by sheet-molding of a film or sheet of said laminate.

16. A multi-layer plastic vessel as set forth in claim 1, which is in the form of a bottle or cup.

* * * * *